US006529736B1

(12) United States Patent
Kopetzky

(10) Patent No.: US 6,529,736 B1
(45) Date of Patent: Mar. 4, 2003

(54) NAVIGATION CONFIGURATION AND METHOD OF UTILIZING A COMMUNICATIONS NETWORK, ESPECIALLY A MOBILE RADIO NETWORK

(75) Inventor: Peter Kopetzky, Unterhaching (DE)

(73) Assignee: Siemens Aktiengesellschaft, München (DE)

(*) Notice: Subject to any disclaimer, the term of this patent is extended or adjusted under 35 U.S.C. 154(b) by 116 days.

(21) Appl. No.: 09/671,824

(22) Filed: Sep. 27, 2000

(30) Foreign Application Priority Data

Sep. 27, 1999 (DE) ........................................ 199 46 162

(51) Int. Cl.[7] .......................... H04Q 7/20; G01C 21/30
(52) U.S. Cl. ....................................... 455/456; 701/209
(58) Field of Search .......................... 455/456; 701/209, 701/202, 210; 340/990, 995

(56) References Cited

U.S. PATENT DOCUMENTS 5,933,100 A 8/1999 Golding

FOREIGN PATENT DOCUMENTS

| | | | |
|---|---|---|---|
| DE | 42 14 067 | C2 | 11/1993 |
| DE | 195 19 066 | A1 | 5/1996 |
| DE | 196 25 002 | A1 | 1/1998 |
| EP | 0 638 887 | A2 | 2/1995 |
| GB | 2 298 539 | A | 9/1996 |

OTHER PUBLICATIONS

Stefan Gneiting: "Verkehrsdienste online" [on–line traffic services], *Funkschau 10/99, pp. 34–39.*

*Primary Examiner*—William Cumming
(74) *Attorney, Agent, or Firm*—Laurence A. Greenberg; Werner H. Stemer; Ralph E. Locher

(57) ABSTRACT

A navigation configuration is described that utilizes a communications network, an access device, a processing system central to the communications network, a navigation database connected thereto, a location determining device, a route control system connected to the route planning system and to the location determining device through the communications network, and an output device connected to the route control system through a media transfer device. The output device outputs local navigation information for directing a travel direction of a user.

24 Claims, 2 Drawing Sheets

NAVIGATION CONFIGURATION AND METHOD OF UTILIZING A COMMUNICATIONS NETWORK, ESPECIALLY A MOBILE RADIO NETWORK

BACKGROUND OF THE INVENTION

Field of the Invention

The invention relates to a navigation configuration utilizing a communications network and a corresponding method. Road users (i.e. automobile owners) are dependent on an abundance of information; they must know, among other things, the safest and quickest way to reach their destination. Navigation systems provide the road user with support and help in this task. For some time there have been motor-vehicle-supported navigation systems, integrated driver info systems (IDIS), the navigable database of which is hard-coded on a CD. These motor-vehicle-supported navigation systems are autonomous devices without any connection to an infrastructure and to current traffic events.

In addition, "macroscopic" traffic guidance systems such as interchange road signs on sign gantries, guidance computers for global control of traffic flows on freeways and feeders, traffic light controls, road condition monitoring and speed direction must also be mentioned.

Most recently, solutions have been sought for combining the systems with one another in order to obtain current and accurate data on the traffic situation and to convey the data to the road user in a form which can be absorbed as easily as possible. Systems have been developed which make use of infrared beacons (proximity beacons) set up by the roadside in order to transmit local traffic information into the vehicle. These so-called "ALI-SCOUT" systems are pioneering in their functionality but have the severe disadvantage that no investors can be found for setting up the required expensive beacons to provide complete coverage.

A route recommendation system, where current traffic data are fed in centrally, is described in the article titled "Verkehrsdienste Online", (On-line Traffic Services), Funkschau No. 10/99, p. 34 ff. This system automatically determines the location data of a user via a radio cell in which a mobile telephone is registered. The user can make a selection from the information for a certain freeway section or for the area around the current location via a keypad of his mobile telephone.

Apart from a mere interrogation of congestion reports, this system also provides automatic route planning and an indication of the traveling route on a display in the vehicle.

The user has to enter the desired destination. Using this input and the current location of the user, a central computer calculates the shortest route taking into consideration the obstacles that can be recognized from the traffic messages. This route is transmitted via a short message service of the global system for mobile communications (GSM) mobile radio and is outputted as a table on the display. All nodes on the route at which the road user can respond are listed.

This known navigation system has the disadvantage that the route is indicated on a display of a device installed in the vehicle.

In this navigation device, the location data of the user are only determined when the destination is input and thus the vehicle which is at a specific node is not "actively" tracked during the entire trip. The advantage of the navigation information is therefore lost if a recommendation is not followed. The further optimum route is only calculated after a new inquiry and is again subject to costs. In addition, the known system does not in any way utilize the resources of the network structure.

SUMMARY OF THE INVENTION

It is accordingly an object of the invention to provide a navigation configuration and a method utilizing a communications network, which overcomes the above-mentioned disadvantages of the prior art devices and methods of this general type, which provides a driver with inexpensive route information throughout the entire trip from outside of the vehicle.

With the foregoing and other objects in view there is provided, in accordance with the invention, a navigation system formed of a communications network containing a navigation database having navigation data for navigating. A route planning system for determining global navigation information is connected to the navigation database. A processing system is connected to the navigation database and the route planning system. An access device for accessing the communications network over an air interface and containing an input device for inputting a destination is provided. A location determining device for determining location data of a user is provided. The location determining device is connected to the access device and outputs the location data. A route control system is connected to the location determining device and to the route planning system through one of the communications network and the access device. The route control system periodically or continuously evaluates the location data output by the location determining-device and compares current location data of the user with the global navigation information. A media transfer function device is connected to the route control system. An output device is connected through the media transfer function device to the route control system, the output device outputs local navigation information derived from the global navigation information and the location data.

The invention includes the essential concept of utilizing a communications network for navigation, especially a mobile radio network which can be accessed for navigation through to the mobile radio terminal or a mobile data terminal, and of transmitting current information from a central computer to the mobile radio terminal and displaying it there in a user-selectable format (e.g. as voice output).

The navigation database is preferably adaptive, i.e. dynamically variable in order to be able to include the current traffic situation in the process of navigation. Since this solution provides adequate computer and storage capacity (in the network), information can be combined in almost any way (e.g. connected to other databases, especially a classified directory database, traffic radio database, rail traffic database or local traffic database). Thus, as well as road information, special terms can also be entered as destination input.

The navigation database preferably has connection matrices which contain path/time forecasts for the connection elements. These values adapt themselves to the current time of day and are overwritten by the current traffic situation.

The communications network preferably contains a central network data processing system (a powerful computer having a large, complex database that can answer a large number of requests within a short time) or is connected to such a system. In particular, the system can take the form of a server of a data service (e.g. Internet, WAP, SMS)I of a service control node in an intelligent network or other service node, depending on the embodiment.

The access device to the communications network preferably contains a mobile radio terminal and interfaces already existing in the network (e.g. SCP-HLR interface and SQL/ODBC interworking). Using the mobile radio terminal has the advantage that the road user can always carry the access device with him independently of the choice of transport device and even when he is on foot.

Advantageously, special user profiles are provided and this configuration is thus applicable to various groups of people. For example, an audio indication for blind people and visually impaired people is provided or, for example, a voice input for car drivers who have problems with operating the device manually.

In addition, the navigation information is displayed by automatic outputs without additional user input.

By combining the navigation database with other databases, the user can request this navigation service for various kinds of transport and a change of the type of transport can be proposed to the user on the basis of the current traffic situation.

The user can preferably select an optimization criterion for the global navigation information (e.g. shortest distance, shortest traveling time, most cost-effective connection etc.).

The navigation system is advantageously distributed to separate functional units for route planning and route control. Route planning (especially algorithms for advanced planning of the shortest route) requires high computing power with few data to be transmitted. Route control requires low computing power with a high data flow (continuous transmission of the current location data). It is therefore advantageously undertaken as close as possible to the terminal or inside the latter. It is only in the case of a deviation from the preplanned route that route planning is initiated again by the route control system.

The route control system is advantageously implemented as hardware and/or software in the mobile radio terminal. This cascading of the route planning system and route control system results in a reduction of the network load.

As an alternative, the route control system can be provided in the communications network. This solution does not require the user to have separate hardware or software and the mobile radio terminal is used only as a user interface.

The route control system uses a media transfer function device for transferring the local navigation information currently relevant to the user as prerecorded or presynthesized voice, text, graphics or data. The media transfer function device can be resident in the network and/or in the terminal.

In the proposed network-integrated approach, media transfer devices for voice, text, graphics and data (called Specialized Resource Function=SRF in this case), which can be driven, for example, via an intelligent network application part (INAP) interface according to ITU Q 12xx, can be advantageously used for messages to the service user. If an implementation in the intelligent network is used, the controlling server and its feedlines are only loaded with signaling traffic but not with user channels. Access to the central SRF function in the network or an IN messaging gateway also enables efficient implementation of selectable output formats (voice, SMS, WML, SMTP etc.). As an alternative, the media transfer function device can also be implemented in the terminal.

As a location determining device, a GPS receiver that is provided in the mobile radio terminal or connected to it, and a chip-based terrestrial-field compass, can advantageously be used. Furthermore, gyroscopic direction determining (gyrocompass), GLONASS, the Russian version of GPS; LORAN-C, a ground-based radio location system, radio location by low earth orbiting (LEO) satellites or GSM differential time delay analysis can also be used. In this method, a triangulation method is preferably used in which the delay of signals from different base stations is compared. However, mobile position determining systems (MPS) in which the location is determined not in the terminal but in a central server (mobile location center) can also be used. If the location information is available in mobile switching centers, it is preferable to use this.

Charging for the global navigation information and local navigation information found is carried out by utilizing the existing charging structures (especially that of the intelligent network (IN)) via IN-AMA tickets and depending on utilization.

In accordance with an added feature of the invention, the communications network is an intelligent network.

In accordance with an additional feature of the invention, the communications network has a base station system, and the access device has a mobile radio terminal and interfaces the communications network through the base station system.

In accordance with another feature of the invention, the route planning system and the route control system interact with one another in a cascaded manner.

In accordance with a further feature of the invention, the invention has means for selecting special user profiles, means for selecting various transport modes by the user, means for selecting an optimization criterion for the global navigation information, and means for selecting various output formats of the local navigation information output to the user.

In accordance with a further added feature of the invention, the location determining device is provided in the communications network.

In accordance with a further additional feature of the invention, the route control system is implemented as software in the mobile radio terminal.

With the foregoing and other objects in view there is provided, in accordance with the invention, a method for navigating a user. The method includes the step of inputting destination information through an access device to a processing system being one of part of a communications network and connected to the communications network. Location data of the user is determined using a location determining device. The location data of the user and the destination information is transmitted from the communications network to a route planning system. Guidance information is read from a navigation database in dependence on the destination information and the location data of the user. Global navigation information is determined in the route planning system. The global navigation information and current location data of the user is transferred to a route control system. The global navigation information and the current location data of the user are periodically or continuously compared in the route control system for obtaining a local navigation information item. The local navigation information item is transferred to the user using an output device connected to the route control system through a media transfer function device.

In accordance with an added feature of the invention, there is the step of writing the navigation data continuously or periodically using a permanent or periodically established connection of the navigation database to other databases, including a classified directory database, a traffic radio database, a rail traffic database and a local traffic database.

In accordance with an additional feature of the invention, there is the step of carrying out a charging of a fee for the global navigation information and the local navigation information found utilizing charging structures of the communications network.

In accordance with a concomitant feature of the invention, there is the step of providing the global navigation information with an intermodal route recommendation which considers current traffic situation.

Other features which are considered as characteristic for the invention are set forth in the appended claims.

Although the invention is illustrated and described herein as embodied in a navigation configuration and a method utilizing a communications network, especially a mobile radio network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
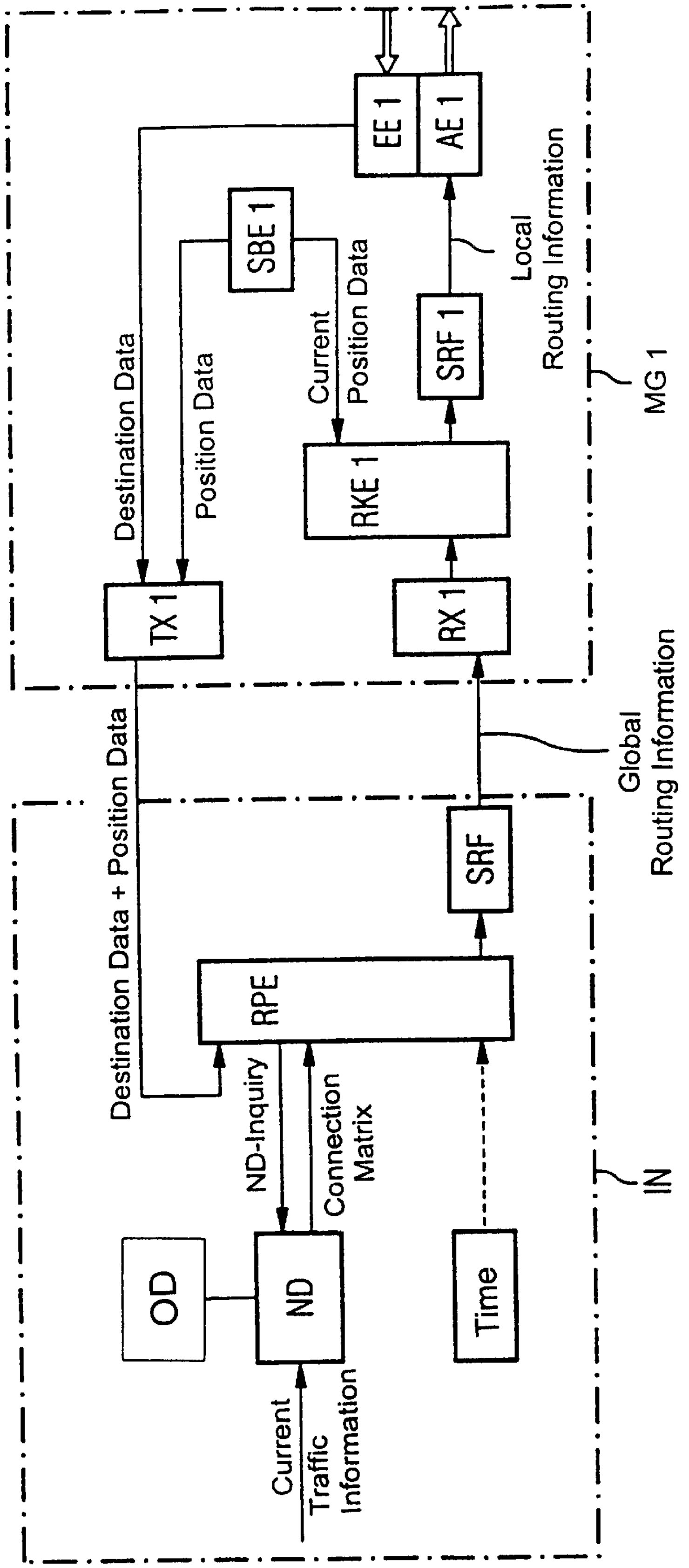
FIG. 1 is a block diagram of a first embodiment of a configuration being a cascaded configuration and according to the invention.

In all the figures of the drawing, sub-features and integral parts that correspond to one another bear the same reference symbol in each case. Referring now to the figures of the drawing in detail and first, particularly, to FIG. 1 thereof, there is shown a configuration containing a mobile radio terminal MG 1. The mobile radio terminal MG 1 contains a conventional mobile radio keypad and a microphone as an input device EE 1, a display and a loudspeaker as an output device AE 1, a route control system RKE 1 integrated as software in the device, and an integrated global positioning satellite (GPS) receiver being a location determining device SBE 1. Alternatively, the location determining device SBE 1 can be a chip-based terrestrial-field compass or be a combantion of the compass and the GPS receiver. Furthermore, the mobile radio terminal MG 1 has a transmitter TX 1 and a receiver RX 1 for exchanging radio signals with non-illustrated base stations of a mobile radio network. The input device EE 1 is connected to the transmitter TX 1 so that data can be transmitted from the input device EE to the transmitter TX 1. The location determining device SBE 1 is connected to the transmitter TX 1 and to the route control system RKE 1 in order to transfer location data to these devices. An input of the route control system RKE 1 is connected to the receiver RX 1 and its output is connected to the output device AE 1 via a media transfer function device SRF1.

The configuration also has a communications network that is configured as an intelligent network IN. The connection between the mobile radio terminal MG 1 and the intelligent network IN is effected by a service switching point (SSP) which forms the interface between the two networks. The intelligent network IN hardware includes digital switching centers (service switching points) and corresponding service control points (SCP). The service switching point recognizes the actual call-up of an intelligent service and forwards the information to the corresponding service control point. The service control point, which is formed by one or more computer systems, contains a route planning system RPE, which receives data input via the service switching point, and a complex navigation database ND. The route planning system RPE, in turn, is connected to the navigation database ND and transfers inquiry data to the navigation database ND and reads out data called up from the navigation database ND. The navigation database ND is dynamically connected to other databases (classified directory database, traffic radio database, rail traffic database, air traffic database, local traffic database) in order to create the shortest connection and to propose a change of transport on the basis of the current traffic situation. The route planning system RPE is also connected to a timer/clock ZEIT. The route planning system RPE calculates the traveling time to be expected. The forecast of the traveling time for the individual route sections is dependent on the current clock time, especially when using public transport, such as during rush hour. The route planning system RPE is also connected to the mobile radio terminal MG 1 by the service control point SCP in order to forward the information found.

In the text that follows, the configuration of a navigation service is explained in greater detail. The user will first trigger the service request by dialing a service code by using the input device EE 1 of the mobile radio terminal MG 1. He will then be requested, under menu control, to specify his destination in a certain format. Location data of the user are determined via the global positioning satellite receiver SBE 1 integrated in the mobile radio terminal MG 1 and transmitted by the transmitter TX 1 simultaneously with the destination input via the mobile radio terminal MG 1 through the service switching points to the fixed structures of the intelligent network IN.

The service switching point detects the request of an IN service and forwards the input data to the corresponding service control point at which the actual service is running. The input data, the destination input and the location data of the user are transferred to the route planning system RPE. The route planning system RPE transfers the inquiry data to the navigation database ND. The navigation database ND, which is connected to other databases OD, uses the destination input and the location data and the current traffic situation to generate the shortest, the fastest and the most inexpensive connection to the desired destination. This information is transferred as a connection matrix to the route planning system RPE and then a global navigation information item and the charges determined for the utilization of the service are forwarded to the mobile radio terminal MG 1 via the service switching points.

The global navigation information is received via the receiver RX 1 of the mobile radio terminal MG 1 and transferred to the route control system RKE 1. The route control system RKE 1 also receives the current location data of the user via the location determining device SBE 1 and, taking into consideration the current location data and the global navigation information, a route control system RKE 1 outputs a local navigation information item via the output device AE 1 of the mobile radio terminal MG 1.

It should be noted with respect to the above example that it is not an intelligent network but a structure of a conventional communications network equipped with a central processing unit which is considered to be the currently preferred embodiment.

Figure 2:
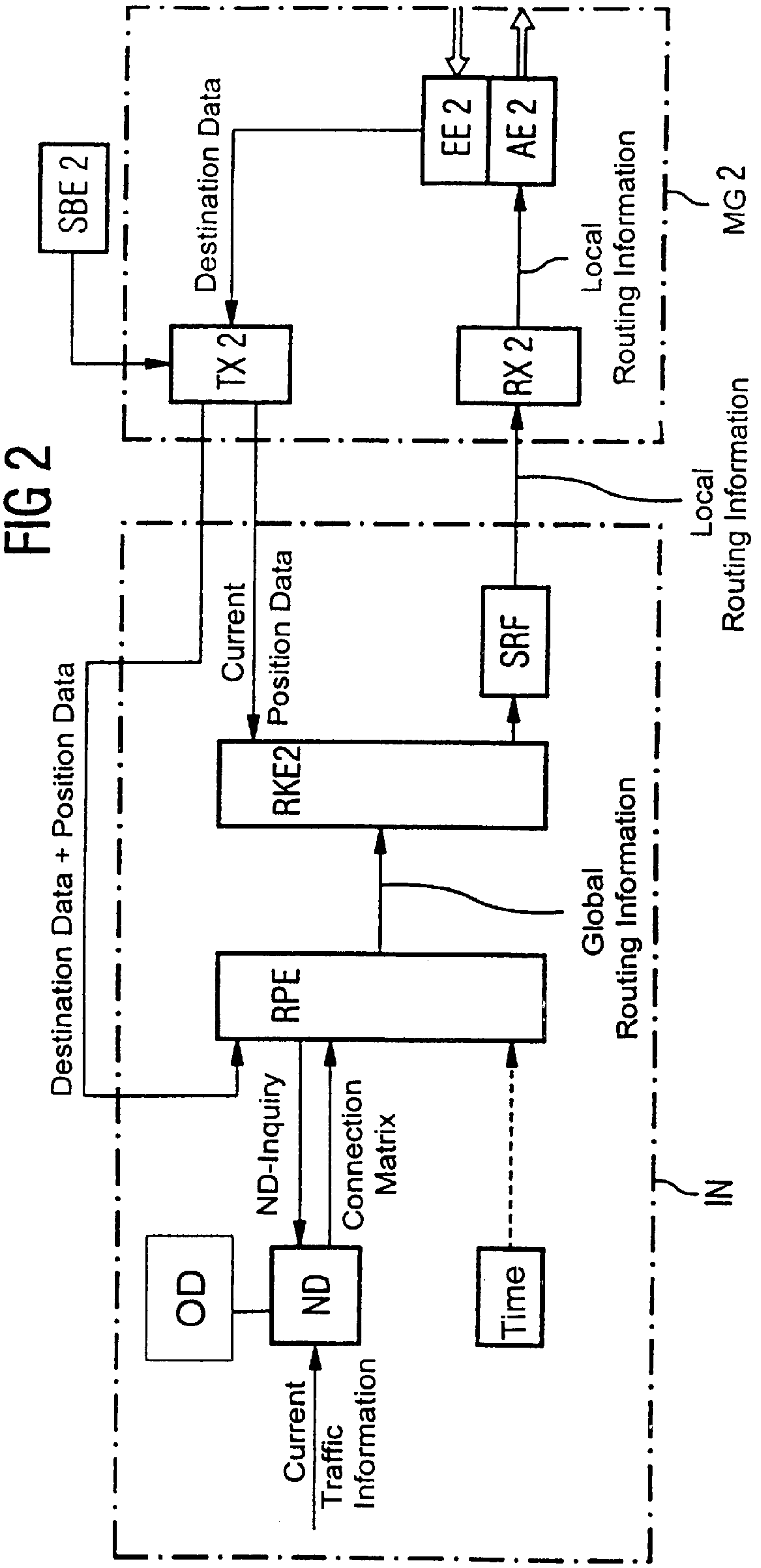
FIG. 2 is a block diagram of a second embodiment of the configuration with a remote terminal but without internal intelligence.

FIG. 2 shows another illustrative embodiment of the configuration according to the invention. In this configuration, a conventional mobile radio terminal MG 2 is used. A GPS walker, which is connected by a soft-modem via a cable to a PC interface of the mobile radio terminal MG 2, is used as a location determining device SB 2. Furthermore, the mobile radio terminal MG 2 contains an input device EE 2 for inputting the destination, an output device AE 2 for outputting the navigation information and a transmitter TX 2 and a receiver RX 2 for exchanging radio signals with base stations of a mobile radio network. In this solution, a route control system RKE 2 is provided in the intelligent network (already assumed above). The route control system RKE 2 is directly connected to the route planning system RPE and contains the global navigation information of the route planning system RPE. The route control system RKE 2 is also connected to the mobile radio network by the service switching point and thus receives the current location data from the transmitter TX 2 and transmits the local navigation information to the output device AE 2 via the receiver RX 2.

The illustrative embodiment represents a more inexpensive solution since, first, the intelligence is completely provided in the intelligent network IN, and, second, the network load is increased by continuously transmitted navigation information.

I claim:

1. A navigation system, comprising:

a communications network containing a navigation database having navigation data for navigating, a route planning system for determining global navigation information and connected to said navigation database, and a processing system connected to said navigation database and said route planning system;

an access device for accessing said communications network over an air interface and containing an input device for inputting a destination;

a location determining device for determining location data of a user, said location determining device connected to said access device and outputting the location data;

a route control system connected to said location determining device and to said route planning system through one of said communications network and said access device, said route control system one of periodically and continuously evaluating the location data output by said location determining device and comparing current location data of the user with the global navigation information;

a media transfer function device connected to said route control system; and an output device connected through said media transfer function device to said route control system, said output device outputting local navigation information derived from the global navigation information and the location data.

2. The configuration according to claim 1, including other databases selected from the group consisting of address databases, traffic guidance and traffic situation databases, rail traffic databases and local traffic databases, said navigation database contains dynamically variable data which are updated and supplemented via a permanent or periodically established connection to said other databases.

3. The configuration according to claim 1, wherein said navigation database has connection matrices with values which are dependent on at least one of a current traffic situation and time.

4. The configuration according to claim 1, wherein said communications network is an intelligent network.

5. The configuration according to claim 1, wherein said communications network has a base station system, and said access device has a mobile radio terminal and interfaces said communications network through said base station system.

6. The configuration according to claim 5, wherein said route control system is implemented as hardware in said mobile radio terminal.

7. The configuration according to claim 1, wherein said route control system is provided in said communications network.

8. The configuration according to claim 5, wherein said location determining device has a global positioning satellite receiver connected to said mobile radio terminal and a chip-based terrestrial-field compass.

9. The configuration according to claim 1, wherein said route planning system and said route control system interact with one another in a cascaded manner.

10. The configuration according to claim 1, including means for selecting special user profiles.

11. The configuration according to claim 1, including means for selecting various transport modes by the user.

12. The configuration according to claim 1, including means for selecting an optimization criterion for the global navigation information.

13. The configuration according to claim 1, including means for selecting various output formats of the local navigation information output to the user.

14. The configuration according to claim 1, wherein said location determining device is provided in said communications network.

15. The configuration according to claim 5, wherein said route control system is implemented as software in said mobile radio terminal.

16. A method for navigating a user, which comprises the steps of:

inputting destination information through an access device to a processing system being one of part of a communications network and connected to the communications network;

determining location data of the user using a location determining device;

transmitting the location data of the user and the destination information from the communications network to a route planning system;

reading guidance information from a navigation database in dependence on the destination information and the location data of the user;

determining global navigation information in the route planning system;

transferring the global navigation information and current location data of the user to a route control system;

comparing one of periodically and continuously the global navigation information and the current location data of the user in the route control system for obtaining a local navigation information item; and transferring the local navigation information item to the user using an output device connected to the route control system through a media transfer function device.

17. The method according to claim 16, which comprises writing the navigation data one of continuously and periodically using one of a permanent and periodically established connection of the navigation database to other databases, including a classified directory database, a traffic radio database, a rail traffic database and a local traffic database.

18. The method according to claim 16, which comprises carrying out a charging of a fee for the global navigation information and the local navigation information found utilizing charging structures of the communications network.

19. The method according to claim 16, which comprises providing the global navigation information with an intermodal route recommendation which considers current traffic situation.

20. A navigation system, comprising:

a communications network containing a navigation database having navigation data for navigating, and a route planning system for determining global navigation information and connected to said navigation database;

a mobile radio terminal for accessing said communications network over an air interface, said mobile radio terminal including:

an input device for inputting a destination;

a location determining device for determining and outputting location data of a user;

a route control system connected to said location determining device and to said route planning system through the air interface, said route control system one of periodically and continuously evaluating the location data generated by said location determining device and comparing current location data of the user with the global navigation information provided by said route planning system of said communications network;

a media transfer function device connected to said route control system; and an output device connected through said media transfer function device to said route control system, said output device outputting local navigation information derived from the global navigation information and the location data.

21. A navigation system, comprising:

a location determining device for determining and outputting location data of a user;

a mobile radio terminal connected to said location determining device and having an input device for inputting destination information and an output device outputting local navigation information;

a communications network connected to said mobile radio terminal over an air interface, said communications network including:

a navigation database having navigation data for navigating;

a route planning system receiving the destination information from said mobile radio terminal and connected to said navigation database for determining global navigation information in dependence on the destination information;

a route control system connected to said to said route planning system and receiving the global navigation information and the location data from said mobile radio terminal, said route control system one of periodically and continuously evaluating the location data output by said location determining device and comparing current location data of the user with the global navigation information for generating the local navigation information;

a media transfer function device connected to said route control system and receiving the local navigation information, said media transfer function device relaying the local navigation information over the air interface to said output device of said mobile radio terminal.

22. A navigation system, comprising:

a location determining device for determining and outputting location data of a user;

a mobile radio terminal connected to said location determining device and having an input device for inputting destination information and an output device outputting local navigation information;

a processing system connected to said mobile radio terminal over an air interface, said processing system including:

a navigation database having navigation data for navigating;

a route planning system receiving the destination information from said mobile radio terminal and connected to said navigation database for determining global navigation information;

a route control system connected to said to said route planning system and receiving the global navigation information and the location data from said mobile radio terminal, said route control system one of periodically and continuously evaluating the location data output by said location determining device and comparing current location data of the user with the global navigation information for generating the local navigation information;

a media transfer function device connected to said route control system and receiving the local navigation information, said media transfer function device relaying the local navigation information over the air interface to said output device of said mobile radio terminal.

23. The navigation system according to claim 22, including a communications network and said processing system is connected to said communications network.

24. The navigation system according to claim 23, wherein said processing system is an intelligent network.

* * * * *